United States Patent [19]

Shoquist

[11] 4,317,732
[45] Mar. 2, 1982

[54] LIQUID RECONDITIONING SYSTEM

[75] Inventor: William A. Shoquist, Hopkins, Minn.

[73] Assignee: Andrew Engineering, Inc., Minnetonka, Minn.

[21] Appl. No.: 185,157

[22] Filed: Sep. 8, 1980

[51] Int. Cl.³ .................... B01D 37/02; B01D 29/38
[52] U.S. Cl. .................................. 210/744; 210/777; 210/791; 210/106; 210/125; 210/143; 210/167
[58] Field of Search .............. 210/744, 777, 778, 785, 210/791, 796, 106, 107, 108, 143, 167, 168, 169, 121, 123, 125, 407, 408

[56] References Cited

U.S. PATENT DOCUMENTS

| | | | |
|---|---|---|---|
| 3,121,681 | 2/1964 | Baxter | 210/107 |
| 3,169,109 | 2/1965 | Hirs | 210/107 |
| 3,194,399 | 7/1965 | Harms | 210/106 |
| 3,212,643 | 10/1965 | Schmidt | 210/785 |
| 3,627,131 | 12/1971 | Goodman | 210/108 |
| 3,677,406 | 7/1972 | King | 210/777 |
| 3,680,700 | 8/1972 | Ryan | 210/777 |
| 3,741,390 | 6/1973 | Wallace | 210/108 |
| 3,817,378 | 6/1974 | Ross | 210/108 |
| 3,823,823 | 7/1974 | Dokter | 210/791 |
| 3,834,535 | 9/1974 | Portyrata | 210/108 |
| 3,886,071 | 5/1975 | Weis | 210/108 |
| 4,153,552 | 5/1979 | Muther | 210/108 |
| 4,187,175 | 2/1980 | Roberts | 210/108 |

FOREIGN PATENT DOCUMENTS 367876  3/1973  U.S.S.R. ......................... 210/106

Primary Examiner—Ernest G. Therkorn
Attorney, Agent, or Firm—Schroeder, Siegfried, Vidas, Steffey & Arrett

[57] ABSTRACT

A liquid reconditioning system including first and second storage tanks for storing reconditioned liquid and liquid to be reconditioned, respectively. Reconditioned liquid is withdrawn from the first storage tank for use, as required, and returned to the second storage tank. A filter is connected to receive liquid withdrawn from the second tank to filter that liquid and transfer it to the first tank. The present invention detects a condition representative of filter blinding and responds to that condition to automatically regenerate the filter. In a preferred embodiment, the filter is a diatomite filter with filter regeneration being accomplished by mechanical diatomite displacement. A valve at the filter output closes that output during diatomite displacement and then sequentially connects the filter output to the second storage tank, for a predetermined period, and then to the first storage tank. Filter blinding may be detected by monitoring the liquid level in the first storage tank, the decrease in that liquid level indicating that the liquid flow through the filter is below that necessary to maintain an adequate supply for use. Alternatively, a flow meter may be employed at the output of the filter to assure that the flow through the filter is adequate to satisfy the usage requirements.

6 Claims, 3 Drawing Figures

LIQUID RECONDITIONING SYSTEM

BACKGROUND OF PRIOR ART

Liquid reconditioning, for repetitive recycling, has many applications. For example, many machining systems employ a flushing medium in the form of a liquid with the flushing medium being reconditioned and repetitively recycled. Dependent on the requirements of the particular system, the reconditioning can include one or several operations. Often, the removal of particulate material is one of the reconditioning operations with that operation being performed by one of many alternative filtering media.

One problem encountered in nearly every filtering operation is blinding of the filter medium by accumulated particulate material. This results in an increase in pressure drop with an attending decrease in flow through the filter. In many applications, this condition requires a replacement of the filter medium, either by shutting down the system or by switching to a back-up filter. The former necessarily requires personal attention and often results in a disruption of the primary purpose of the system, machining a work piece, for example. The latter, while allowing the system to continue in operation, requires a duplication of system elements which increases the expense of the system.

Diatomite filter media, and their regeneration, are known to the prior art. Such filters employ diatomite which is formed as a layer on a supporting septum and which have proven highly efficient in the removal of particulate materials. As with all filters, continuing operation results in blinding. However, a diatomite filter may be regenerated by repositioning the diatomite on the septum as by mechanically displacing the diatomite and allowing it to reform on the septum. Such regeneration may be accomplished several times before it is necessary to replace the diatomite material. Thus, the utility of a back-up system is greatly reduced. However, those diatomite systems known to the inventor of the present invention require that the regeneration be accomplished manually which requires the same personal attention as is necessary during filter media replacement.

BRIEF DESCRIPTION OF THE INVENTION

The present invention provides a system for detecting filter blinding and automatically regenerating the filter medium which may be adapted to any liquid reconditioning application. The invention has particular application to, and will be disclosed in the context of, a recycling flushing medium. In that context, a first storage tank contains reconditioned liquid which is withdrawn for use, as required. A second storage tank receives the used liquid while a filter interconnects the first and second storage tanks. Used liquid is withdrawn from the second tank and passed through the filter after which it is transferred to the first storage tank for use. Filter blinding may be detected by monitoring the liquid level in the first storage tank with a low level indicating that the flow rate through the filter is unable to maintain an adequate supply for use. Alternatively, the output of the filter may be monitored by a flow meter. In either case, an inadequate flow through the filter is detected to automatically result in regeneration of the filter. In a preferred embodiment, the filter is a diatomite filter whose output is controlled by a valve. The valve is controlled to alternatively close the filter output, connect the output to the second storage tank or connect that output to the first storage tank. During regeneration of the diatomite filter, the filter output valve is first closed after which the diatomite is repositioned by mechanical displacement. Thereafter, the filter output valve is sequentially connected to the second storage tank, for a predetermined period, after which it is connected to the first storage tank where it remains until regeneration is again necessary.

DETAILED DESCRIPTION OF THE INVENTION

For the purpose of this specification and claims, the terms "filter blinding" and "blinding" mean the reduction or shutting off of flow through a filter caused by the build up of particulate materials during filtering.

Figure 1:
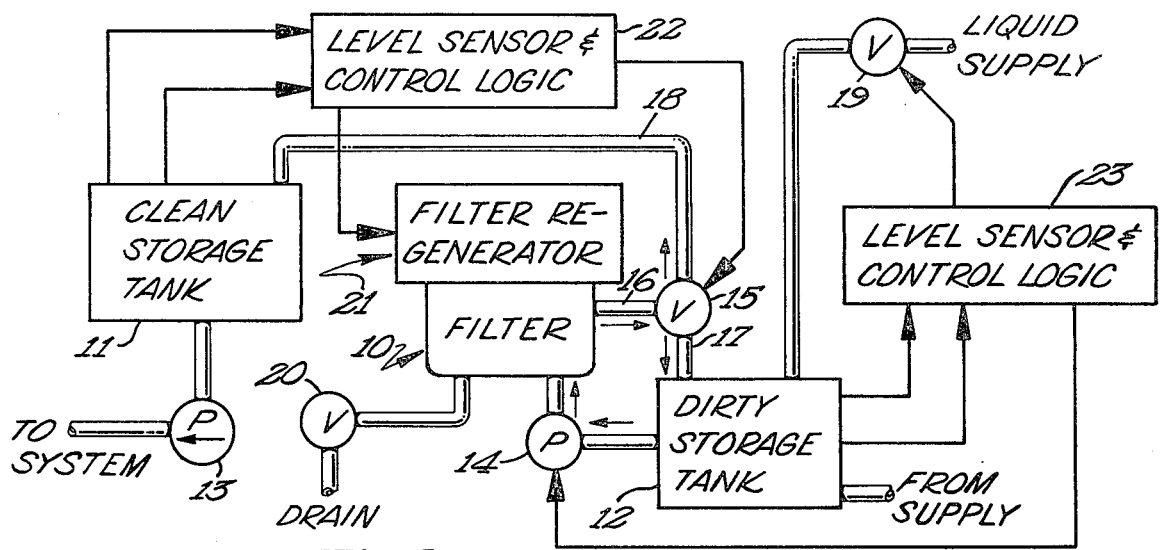
FIG. 1 is a diagrammatic illustration of a portion of a liquid reconditioning system, including a preferred embodiment of the present invention.

FIG. 1 illustrates the filtering portion of a liquid reconditioning system including a filter 10, clean storage tank 11 and dirty storage tank 12. Liquid is withdrawn from the clean storage tank 11 by a pump 13 and delivered to a system for use, as required. The system may be a system for machining a work piece with the liquid delivered to it functioning as a flushing medium. Parallel reconditioning systems, such as a liquid de-ionizer, for example, may also be employed during the liquid reconditioning operation. Such parallel systems form no part of the present invention.

Used liquid is returned from the system to the dirty storage tank 12. A pump 14 draws liquid from the dirty storage tank 12 and delivers it to the input of the filter 10. The output of the filter 10 is connected to a valve 15 via a line 16. As will be discussed more fully below, the valve 15 is controllable to close the filter 10 output or, alternatively, to connect that output to the dirty storage tank via line 17 or to connect the filter 10 output to the clean storage tank 11 via a line 18. Fresh liquid is added to the system by a valve 19 which connects the dirty storage tank 12 to a liquid supply. The filter 10 may be drained by a manual valve 20.

A filter regenerator 21, to be discussed more fully below, is associated with the filter 10 and is operable to regenerate the filter 10. The term "regenerate" is intended to embrace those operations whose effect is to counter filter blinding without removal of the filter medium from the filter 10. In the context of a diatomite filter, this is accomplished by a repositioning of the diatomite material within the filter 10 by mechanical displacement of that material and the reforming of that material on its supporting septum. Such diatomite regeneration will be discussed more fully below with reference to FIG. 2.

Filter regenerator 21 and valve 15 are controlled by a level sensor and control logic 22 which senses upper and lower liquid levels within clean storage tank 11. The pump 14 and valve 19 are controlled by a level sensor and control logic 23 which is responsive to upper and lower liquid levels within the dirty storage tank 12. Other controls for the various pumps and controllable valves, both manual and automatic, may be provided to assure their proper operation in association with the system for which liquid is being reconditioned. The illustrated controls illustrate only the interaction between the various illustrated components.

In operation, the pump 13 will deliver reconditioned liquid to a utilizing system in accordance with its needs. That liquid, after use, will be returned to the dirty storage tank 12 from which it is withdrawn by the pump 14 and passed through the filter 10. During normal operation, the valve 15 will connect the line 16 to the line 18 resulting in a flow of the filter output to the clean storage tank 11. Filtering blinding will result in a reduction of flow through the lines 16 and 18 and, eventually, a decrease in the liquid level in the tank 11. That liquid level decrease will be sensed by level sensor 22 which will initiate the regenerating sequence for filter 10. The first step in that sequence is a closing of the output of the filter 10 by the valve 15 under the control of the level sensor and control logic 22. With the filter 10 output closed, the filter regenerator will begin the regeneration of the filter 10, as will be discussed more fully below. Subsequently, valve 15 will connect the filter 10 output to the dirty storage tank 12 by interconnecting the lines 16 and 17. The output of the filter will be delivered to the dirty storage tank 12 for a predetermined period of time while the filter completes its regeneration after which the valve 15 will connect the filter 10 output to the clean storage tank 11 by connecting the lines 16 and 18. Thereafter, the liquid level in the clean storage tank 11 will increase due to reduced blinding of the filter 10 and an increased liquid flow through the filter.

In the event that the liquid level in the clean storage tank 11 approaches its capacity, that fact may be sensed by the level sensor and control logic 22 to connect the filter 10 output to the dirty storage tank 12. Alternatively, pump 14 may be shut down in this condition. Level sensor and control logic 23 senses two levels in dirty storage tank 12. Both are low liquid level conditions. The uppermost of those levels indicates a low liquid level and results in an activation of valve 19 to allow liquid from the liquid supply to be added to the dirty storage tank 12. The lower liquid level sensed by level sensor and control logic 23 indicates an out-of-liquid condition and results in a shut-off of the pump 14.

Figure 2:
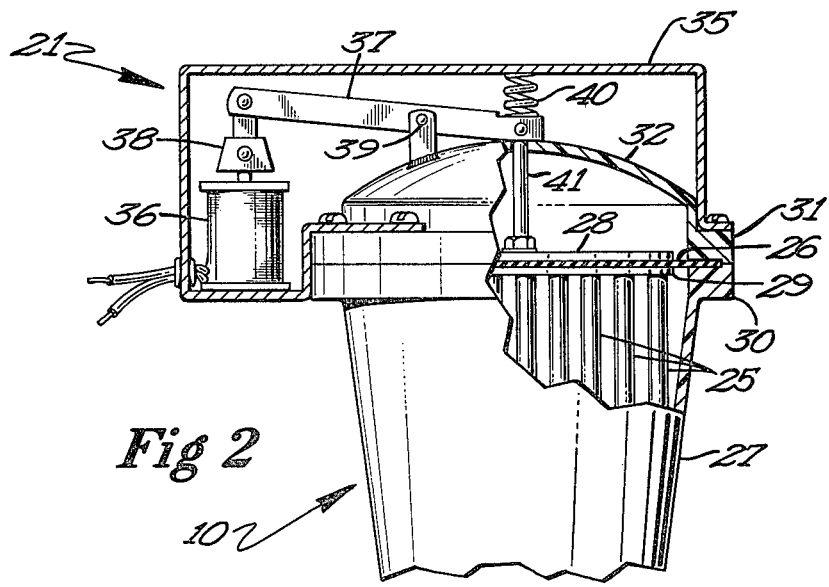
FIG. 2 illustrates a filter regenerating system in accordance with the present invention.

FIG. 2 illustrates a preferred embodiment of a filter 10 and regenerator 21. Filter 10 is a diatomite filter, that is a filter using diatomaceous earth as the filter medium. Such filters are known to the prior art including those having the general configuration illustrated in FIG. 2. Diatomite filters employ a septum as the supporting mechanism for the diatomite filter medium. In the preferred embodiment illustrated in FIG. 2, the septum takes the form of a plurality of tubes 25 suspended within the body of filter 10. A diaphragm 26, made of a flexible material, spans the upper opening of a canister 27 which forms the main portion of the filter body. Upper and lower rigid plates, 28 and 29, respectively, support the tube elements 25 and may be secured to each other as by bolts extending from one to the other and into engagement with cooperating nuts. This arrangement allows the tubes 25 to be supported within the canister 27 while the flexible diaphragm allows a vertical movement of the interconnected plates 28 and 29, and supported tubes 25 within the canister 27. Diaphragm 26 is supported between flanges 30 and 31 formed along the upper portion of canister 27 and cooperating cover 32, respectively.

Regenerator 21 is supported on the filter 10 by a frame 35. A solenoid 36 is supported on the frame 35 and has its actuated arm connected to a lever 37 by a clevis connection 38. The lever arm 37 is supported for pivotal movement around a support 39 secured to the outer surface of cover 32. A spring cooperates with the lever arm 37 and frame 35 to bias the lever arm 37 in the position shown while a shaft 41 extends between the lever arm 37 and the upper plate 38 to move the assembly of upper plate 28, lower plate 29, diaphragm 30 and the tubes 25 forming the septum, on movement of the lever arm 37. With diatomite in place on the tubes 25, activation of solenoid 37 will result in a pivotal movement of the lever arm 37 and the compression of the spring 40 with a corresponding movement of the assembly formed of elements 28–30 and 25 in response to the movement of the shaft 41. This results in a displacement of the diatomite carried by the tubes 25 similar to the displacement that would occur on backwashing. Thereafter, flow through the filter will cause the diatomite to reposition itself on the tubes 25 and reform the filter medium. Thus, blinding of the filter medium can be countered by the regenerator 21 through activation of the solenoid 36. Several activations of solenoid 36 may be necessary before flow through the filter is resumed so as to displace sufficient diatomite filter medium to result in an adequate repositioning for significant blinding reduction. It is presently contemplated that five activations of the solenoid 36 is adequate during the time that the valve 15 (See FIG. 1) closes the output of the filter 10. Resumed flow through the filter will cause the diatomite to reform the filter element on the tubes 25. During this reforming period, the valve 15 connects the line 16 to the line 17 (See FIG. 1).

Figure 3:
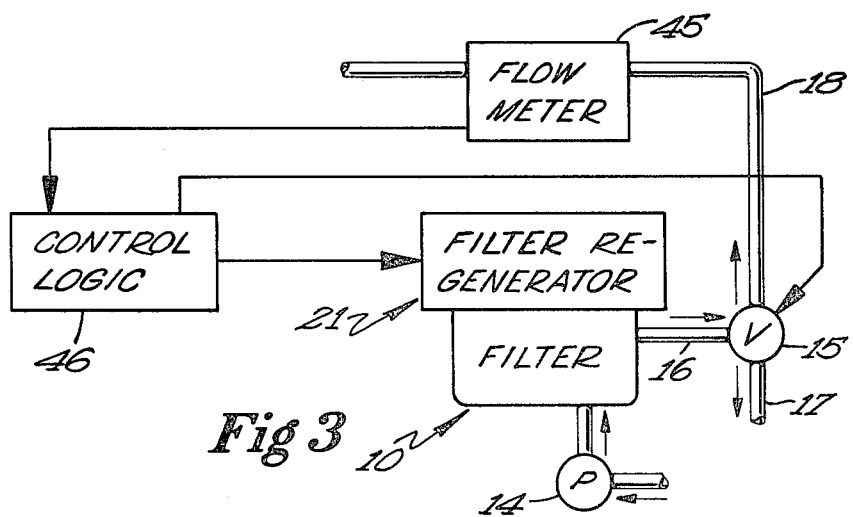
FIG. 3 illustrates an alternative embodiment to a portion of the system illustrated in FIG. 1.

FIG. 3 illustrates an alternative to a portion of the embodiment of FIG. 1 and, particularly, an alternative to the level sensor and control logic 22. In FIG. 1, level sensor and control logic 22 senses filter blinding by sensing liquid level in clean storage tank 11. In FIG. 3, filter blinding is detected by monitoring the flow through line 18 with a flow meter 45. When the flow in line 18 becomes too low to satisfy the requirements of the utilization system, or approaches those requirements to any predetermined degree, that fact will be established by flow meter 45 and communicated to control logic 46. Control logic 46 will operate to control the valve 15 and filter regenerator 21 in a manner similar to that described with reference to level sensor and control logic 22 to sequentially close the output of filter 10, activate filter regenerator 21, and sequentially connect the line 16 to the lines 17 and 18.

Many modifications and variations of the present invention are possible in light of the above teachings. For example, filter blinding may be established by monitoring the pressure drop across the filter 10. However, this would require an exposure of the pressure monitoring device to the dirty side of the filter 10 and could result in its eventual blockage. Thus, while pressure monitoring is an alternative for establishing filter blinding, the disclosed embodiments are presently preferred. In addition, other filter configurations may be employed which are capable of regeneration with the scope of the present invention. It is therefore to be understood that, within the scope of the appended claims, the invention may be practiced otherwise than as specifically described.

I claim:

1. In a liquid reconditioning system of the type having first storage means for storing reconditioned liquid, having means for withdrawing reconditioned liquid from said first storage means for use as required, having second storage means for storing used liquid to be reconditioned and having means interconnecting said first and second storage means for transferring liquid from said second storage means to said first storage means while filtering particulate material therefrom, said interconnecting means including filter means having septum means for supporting diatomite and valve means connected to the output of said filter means, the improvement for automatically regenerating said filter which comprises means for detecting a condition representative of filter means blinding and means responsive to said detecting means for vertically moving said septum means within said filter means while said valve means closes said filter means output, said valve means sequentially connecting said filter means output to said second storage means, for a predetermined period, and said first storage means following septum means movement.

2. The liquid reconditioning system of claim 1 wherein said detecting means comprises means sensing liquid level in said first storage means.

3. The liquid reconditioning system of claim 1 wherein said detecting means comprises flow meter means.

4. A method for automatically regenerating a filter in a liquid reconditioning system of the type having a first storage means for storing reconditioned liquid, having means for withdrawing reconditioned liquid from said first storage means for use as required, having second storage means for storing used liquid to be reconditioned and having means interconnecting the first and second storage means for transferring liquid from the second storage means to the first storage means while filtering particulate material therefrom, the interconnecting means including filter means having septum means for supporting diatomite and valve means connected to the output of the filter means, comprising the steps of:

detecting a condition representative of filter means blinding;

vertically moving said septum means within said filter means while said valve means closes said filter means output on detection of filter means blinding; and sequentially connecting said filter means output to said second storage means, for a predetermined period, and said first storage means following septum means movement.

5. The liquid reconditioning method of claim 4 wherein said detecting step comprises the step of sensing liquid level in said first storage means.

6. The liquid reconditioning method of claim 4 wherein the detecting step comprises the step of metering liquid flow.

* * * * *

UNITED STATES PATENT AND TRADEMARK OFFICE
CERTIFICATE OF CORRECTION

PATENT NO. : 4,317,732
DATED : March 2, 1982
INVENTOR(S) : William A. Shoquist

It is certified that error appears in the above-identified patent and that said Letters Patent are hereby corrected as shown below:

Column 3, line 33, "the" should be --that--.

Column 4, line 11, "38" should be --28--.

Column 5, line 10, "whle" should be --while--.

Signed and Sealed this

Twenty-fifth Day of May 1982

[SEAL]

Attest:

Attesting Officer

GERALD J. MOSSINGHOFF

Commissioner of Patents and Trademarks